June 25, 1968  G. MULLINS  3,389,484
INSTRUMENT PANEL LIGHTING
Filed Jan. 28, 1966
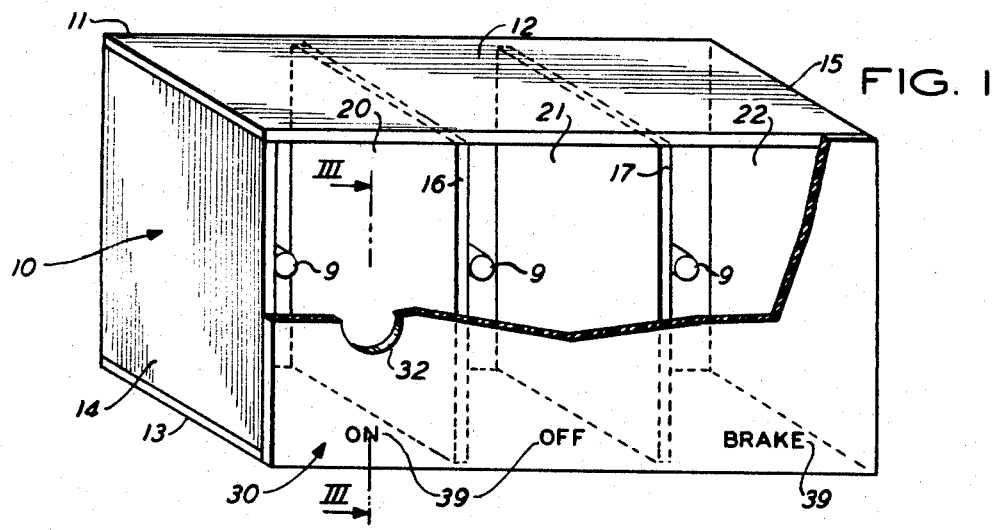
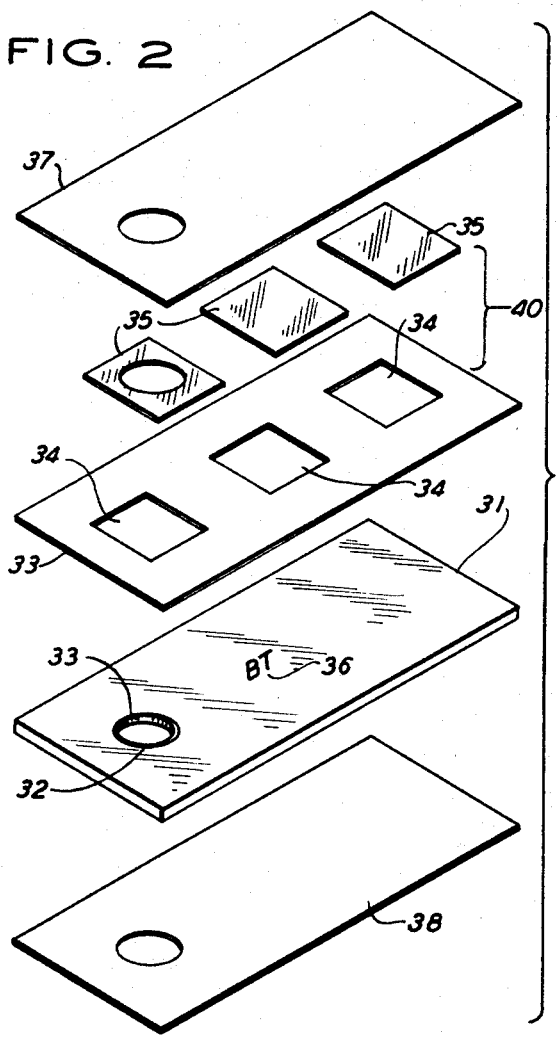
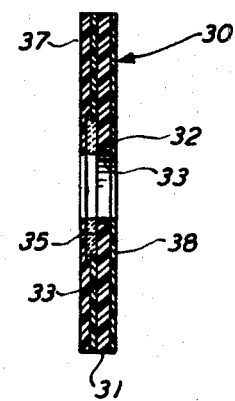
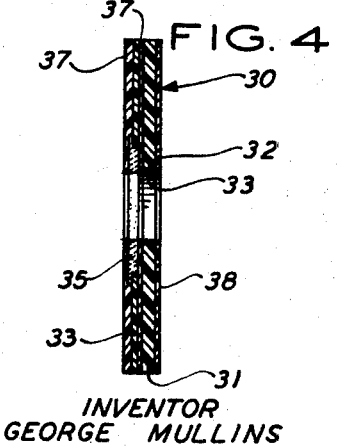
INVENTOR
GEORGE MULLINS
BY Angelo M. Pisarra
ATTORNEY

United States Patent Office 3,389,484
Patented June 25, 1968

3,389,484
INSTRUMENT PANEL LIGHTING
George Mullins, West Caldwell, N.J., assignor to Panelgraphic Corporation, Caldwell, N.J., a corporation of New Jersey
Filed Jan. 28, 1966, Ser. No. 523,635
11 Claims. (Cl. 40—130)

ABSTRACT OF THE DISCLOSURE

Articles of manufacture which are dead front and hide substantially all evidence of read out information until back lit and when back lit reveal well defined visible illuminated areas of certain colors. The articles of manufacture comprise a member which is transparent and tinted gray and therefore neutral so that a color hue is not imparted to the light transmitted thereby and is also characterized by having a light transmittance value of at least 5% and no greater than 30% of that from standard Source A; the percent transmission of light waves in the spectrum of 500–580 millimicrons (green light) and that of light waves in the spectrum of 580–640 millimicrons (orange and yellow light), both averaging at least 5% and no greater than 30% and that in the spectrum of 640–700 millimicrons (red light) averaging at least 5% and no greater than 35%; an opaque coat adjacent the rear face of said member and having an opening therein, a colored indicia coat adjacent the face at said opening and capable of transmitting light in the visible spectrum and of diffusing light, so that when not back lit, the article of manufacture is dead front, but when back lit the colored indicia coat presents a well defined visible illuminated area. The front face of the member carries a light transmitting and diffuse coat having white, red, yellow and orange and green light transmittance values of at least 90% and the front face of the article of manufacture having a gloss value in the range of 5–55 units as determined by using 60 degree Specular Gloss Test in accordance with ASTM D523–53T method.

---

This invention relates to novel articles of manufacture and to devices in which they are components. In one of its more specific aspects, the invention is directed to novel articles of manufacture which hide substantially all evidence of read-out information until activated and to novel devices in which they are components thereof.

For many years others have proposed various instrument panels and the like for providing read-out information when back-lit. Some of them, in this very old and simple art have proposed the use of a clear and highly transparent sheet, composed of clear glass or the like having a very thin silver coating on the normally rear surface front part thereof. Others have proposed the employment of a clear glass or plastic sheet of high transparency carrying various layers of opaque and translucent materials.

For some time there has existed a need for an instrument panel or the like which effectively hides out read-out information and does not act as a mirror and preferably presents a "dead-front" surface when not back-lit, but upon being back-lit presents one and preferably two or more areas thereof visible as desired colored, such as green, yellow, orange, red, etc. hues, illuminated areas or indicia with the remainder being "dead-front." This need has been especially prevalent in those fields where low power sources of illumination are used.

In the course of experimentation, it was unexpectedly discovered that the foregoing unique combination of results could be effectively achieved. After testing a number of different members having different white light transmittance values as well as different transmittance values of light in various parts of the visible spectrum, it was unexpectedly discovered that members having certain white light transmittance values and certain transmittance values in various parts of the visible spectrum provided unique articles of manufacture of this invention when combined with other parts thereof.

According to this invention each of said members is capable of transmitting light and is of the following light transmitting characteristics determined by employing the ASTM D–307–44 method using a General Electric Recording Spectrophotometer and a C.I.E. source A:

(a) the percent transmittance of white light being at least 5 and no greater than 30;
(b) the percent transmittance of the light waves in the spectrum of 500 to 580 millimicrons averaging at least 5 and no greater than 30;
(c) the percent transmittance of the light waves in the spectrum of 580 to 640 millimicrons averaging at least 5 and no greater than 30; and
(d) the percent transmittance of the light waves in the spectrum of 640 to 700 millimicrons averaging at least 5 and no greater than 35.

Said members preferably employed have a percent white light transmittance of at least 10 and no greater than 15; the percent transmittance of light waves in the spectrum of 500 to 580 millimicrons averaging at least 10 and no greater than 15; the percent transmittance of light waves in the spectrum of 580 to 640 millimicrons averaging at least 10 and no greater than 20, and the percent transmittance of light waves in the spectrum of 640 to 700 millimicrons averaging at least 10 and no greater than 20 and the percent transmittance of light waves in the spectrum of 450 to 500 millimicrons averaging at least 10 and no greater than 15.

Also according to this invention, each of said members is coupled with various other parts. The normally rear face thereof has an opaque coat secured thereto. Said coat has one or more openings of appropriate size, dimensions and position whereby a part of said rear surface is exposed. Said exposed areas, with or without printed or other opaque indicia thereon are covered by a light transmitting colored indicia coat including light diffusing material.

Preferentially the front faces of the novel articles of manufacture of this invention have a gloss value in the range of 5 to 55 and optimumly in the range of 15 to 40 units for diminishing objectionable glare and to aid in the appearance of the indicia coat when back-lit. For this and other purposes a thin protective scratch-resistant coat is secured to the normally front face of said member and includes light diffusing material therein. This coat has a high light transmittance value of at least 90% of white light as well as the other portions of the visible spectrum between 450 to 700 millimicrons as measured with a General Electric Light Meter Type 213 or a Gossen Light Meter "Lunasix" (West Germany). Said gloss is determined by using 60 degree Specular Gloss Test in accordance with ASTM D523–53T method.

Said novel articles of manufacture find use as panels, dials, etc. for instruments and the like. When so employed and appropriately coupled therewith, said articles of manufacture present an attractive appearance and are further characterized by being non-glaring and when in the absence of light striking or incident on the normally rear surface thereof and traveling in a direction towards said normally rear surface to the normally front surace thereof, the colored indicia coat is practically invisible when looking in a direction towards said front to said rear surface; and when back-lit whereby light incident on the rear surface thereof while traveling in a direction towards the rear to the front surface, the light transmitting colored coat including light diffusing material is readily visible as an illuminated colored indicia even when the source of light is a miniature filamentary incandescent lamp generally of the low voltage type, about 10 to 40 volt lamps, also of low candle-power generally about .25 to .75 candle-power.

The various objects and advantages of the present invention will be readily apparent from the following detailed description taken in conjunction with the accompanying drawings, wherein:

FIG. 1 is a perspective view of a device, with part broken away illustrating an embodiment of the invention.

FIG. 2 is an exploded view of an illustrative embodiment of a novel article of manufacture of this invention.

FIG. 3 is an enlarged cross sectional view taken on lines III—III of FIG. 1.

FIG. 4 is a view similar to FIG. 3 of another embodiment of the invention, and in this embodiment the colored indicia coat consists of a clear colored transparent layer disposed between a pair of light transmitting and diffusing layers.

As shown in FIG. 1, the novel device comprises a chamber 10 having a rear wall 11, a top wall 12, a bottom wall 13 and side walls 14 and 15 which are secured together to form a box. A pair of spacer elements 16 and 17 are located in said box and secured to the top, bottom and rear walls thereof to provide three compartments 20, 21 and 22. All of said walls and spacer elements are composed of opaque material such as aluminum or the like whose faces have been coated with a film of white or other highly reflective paint. The rear wall of each of said compartments carries a socket accommodating a miniature filamentary tungsten incandescent lamp 9 of low voltage (10–40) low candle-power (.25–.75) examples of which are lamps known as #330 T 1¾ bulb, 14 volt, .08 ampere of Chicago Miniature Lamp Works, and #327 or #324 G.E. 28 volt .34 candle-power lamps of General Electric Company. Each of the individual compartments carrying such an incandescent lamp 9 source of light is light-tight, that is, it prevents the admission of outside light therein except through the open front end thereof.

Mounted at the front of said chamber and forming a light-tight seal therewith is one of said novel panels of this invention which is designated by the numeral 30. The panel includes (A) a member 31 having the light transmitting characteristics (a), (b), (c) and (d) as before defined, a preferred example of which is "Plexiglas #2074 gray" of Rohm & Haas.

Materials of said Rohm & Haas other than asid #2074, which may be employed as member 31 are those on the market as "Plexiglas" #2064, #2088, #2169, #2247, #2370 and #2412. These others as well as #2074 are all further characterized as having an average percent transmittance of light waves in the spectrum of 450 to 500 millimicrons of at least 5 and no greater than 30. However, those whcih are preferably employed are #2074, #2064, #2247, #2088, which are transparent and tinted gray and therefore neutral and consequently do not impart a color hue to light transmitted thereby.

The member 31 can be of any desired thickness, for example, 1/16", 1/8", 1/4", etc. and in this embodiment is approximately 1/8" and is substantially uniform throughout. This particular element 31 (#2074) has a white-light transmittency of approximately 12%, an average transmittance of (blue) light waves in that portion of the visible spectrum between 450 to 500 millimicrons of approximately 10%; an average transmittance of (green) light waves in that portion of the visible spectrum between 500 to 580 millimicrons of approximately 13%; an average transmittance of (yellow and orange) light waves in that portion of the visible spectrum between 580 to 640 millimicrons of approximately 13%; an average transmittance of (red) light waves in that portion of the visible spectrum between 640 to 700 millimicrons of approximately 16%, as measured by said ASTM 307–44 method before set forth. Spectrophotometric data and curves concerning said element 31 as well as other available "Plexiglas" sheets are to be found in the Plexiglas Bulletin "PL–127f" entitled "Design Fabrication and Molded Data" from Plastics Department of Rohm & Haas Company.

The panel 30 before assembly is produced by combining various coatings with 31. When required, it may first have an opening, such as opening 32, drilled less therein. Then one face, which is to be the normally rear face thereof as well as the surface defining such opening are provided with an opaque coat 33 having openings 34 of appropriate dimensions and configurations therein, thereby exposing preselected areas of said normally rear face of member 31.

The opaque coat 33, which in this embodiment is black, is coupled with element 31 in any convenient manner and preferably by first spraying or, in any other suitable manner applying an opaque lacquer or other solution of an opaque film-forming material over the surface defining opening 32 and over the entire normally rear surface of member 31 except for preselected areas which in this embodiment are three in number, with one of them being in alignment with said opening 32 to accommodate a push-button switch (not shown) making a light-tight seal thereat. Then the solvent is evaporated off of the solution of opaque film-forming material applied which may or may not be further heated, depending upon the film forming material used, whereupon the opaque continuous layer or film 33 is produced and is tenaciously secured to that face of the member 31. The thickness of the dry, black, opaque film 33 may be in the range of .5–5 mils and generally is approximately 3 mils. Then a yellow, green, red, or other color light transmitting and diffuser coat 40 is coupled to each of those areas 34 of the normally rear surface of member 31 which were not covered and rendered light impermeable by said opaque film 33. This is preferably affected by first spraying or otherwise applying a clear, light-transmitting appropriately colored lacquer or other solution of a film-forming material on to each of said areas defined by the openings 34 in said opaque film 33.

The clear, colored, light-transmitting, film-forming material is homogeneous and preferably one which has been produced by combining a clear water-white film-forming material with a suitable dye soluble therein for imparting the desired color thereto without reducing the clarity thereof. The color of said clear colored film-forming material is a matter of choice, and in the embodiment shown, one of said areas is covered with a clear yellow film, and another with a clear green film and the third with both a clear yellow and a clear red film.

After applying the individual solutions of clear colored light-transmitting film-forming materials in the openings 34 and on the exposed areas of member 31 defined thereby, the solvent is evaporated off whereby the film-forming materials are dried and are in the form of homogeneous thin films 35 measuring about .5–5 mils and preferably approximately 3 mils in thickness. These individual films 35 are clear colored continuous films tenaciously adhering to the previously exposed surfaces of member 31 covered thereby and to limited areas of the opaque film 33 over which they lap.

If desired, one or more of said films 35 may have another clear different color light-transmitting like film of the same or smaller area superimposed thereon in order to obtain a desired effect. Also, if desired, opaque indicia 36 of the desired color may be applied to portions of said exposed areas of member 31 before the application of said colored films. When such indicia are to be employed, such procedure is recommended; however, they may be applied after said colored films have been applied.

Such indicia may be in the form of letters or numbers as shown.

Then a protective and light-diffusing and light-transmitting coat or film 37 is coupled to the exposed surface of said colored films 35 and also preferably over substantially the entire exposed surface of opaque film 33. This is effected by spraying or otherwise applying a clear water-white lacquer or other solution of film-forming material which was combined with very finely divided particles capable of diffusing light.

After being applied as a thin film, solvent is evaporated off leaving behind a thin continuous film 37 which may or may not be baked, depending upon the film-forming material used, thereby to provide a dry, scratch resistant film or layer 37 tenaciously adhering to the substrate. Film 37 measures .5–5 mils and in this embodiment approximately 3 mils and consists essentially of normally water-white clear film containing finely divided light diffusing solids substantially uniformly dispersed therethrough.

The film 37 is of high transparency and has white, green, yellow and orange and red light transmittance characteristics of at least 90% as measured with said "Lunasix" light meter, and is further characterized as being substantially uniform throughout. Instead of the coat 40 consisting of film or layer 37 superimposed on film or layer 35, it may consist of film 35 superimposed on film 37, or the coat 40 may consist of a single film or layer consisting of a continuous layer of a normally clear film having a dye-coloring material dissolved therein and also having very finely divided light diffusing particles uniformly dispersed therethrough, or the coat 40 may consist of a single film or layer consisting of a continuous layer of a normally clear, uncolored or a normally clear dye-colored film having finely divided colored, such as green, yellow, orange, red, etc., particles dispersed therethrough for the purposes of diffusing incident light and transmitting only light of certain color or colors therethrough. Also, if desired, and this is sometimes preferable, when the coat 40 consists of film 37 in the areas of members 31 defined by openings 34 and over which film 37 is superimposed film 35, the coat 40 may also include a film 37 superimposed on film 35, this providing a three layer coat 40 shown in FIG. 4. The panel, whose cross section is shown in FIG. 4 first has film 37 contiguous with and covering the entire normally rear surface of the member 31 to reduce its static charge, an opaque black film 33 having openings 34 therein is superimposed upon and covers the entire exposed surface of film 37 except the areas thereof defined by said openings a clear, transparent color film 35 is superimposed upon and covers the entire exposed surfaces of film 37, and a film 37 is superimposed upon and covers the entire exposed surfaces of film 35 and preferably also of the entire exposed surface of film 33.

Then a light-diffusing coat 38, preferably of the same composition as coat or film 37, but preferably containing more light diffusing particles, is coupled to and over the entire normally front face of the member 31 in the same manner as that used for the application of film 37. This film 38 is a dry continuous film measuring about 2–7 mils and preferably about 3 mils in thickness and tenaciously adheres to said front face. Like dry film 37, dry film 38 is substantially continuous and consists essentially of normally clear water-white film containing finely divided light diffusing solids substantially uniformly dispersed therethrough. The film 38 is also of high transparency and like film 37 has a white, green, orange and yellow and red light transmittance of at least 90%, as measured with said "Lunasix."

The coats 37 and 38 have an abrasion resistance at least 25% greater than that of member 31, employing the conventional Tabor Abrasion Resistance method, using a 1,000 gram load, CS10 wheel. Besides acting as an abrasion and scratch resistant barrier, the film 38 serves to provide the front face of the article of manufacture 30 with a non-glaring front face. Due to the presence of the finely divided light-diffusing particles component of film 38, the gloss of film 38 as measured by the method heretofore referred to is preferably 15–40 units, obviously controlled by the proportion and characteristics of the light-diffusing particles therein.

The front face of the member 31 may have opaque words or letters 39 printed thereon before the application of the coat 38. These words or letters 39 are visible at all times in the presence of ambient light.

The finished panel 30 is coupled with the chamber 10 to cover the entire front thereof, so that the film 38 is exposed at the front and the rear face of the panel 30 bears against the edges defining the compartments of said chamber thereby making light-tight seals therewith. The openings 34 covered by the colored light transmitting and diffuser coats 40 are of smaller dimensions than the front openings of said compartments and are centrally disposed with respect thereto.

When the panel 30 so coupled with the chamber 10, and none of the lamps in the chambers is energized, the front face of the panel 30 in ambient light appears as an attractive even "dead front" or matte black surface over substantially the entire area thereof, with the colored light transmitting coats 40 being practically invisible so that the read-out information is effectively hidden. When the miniature lamps are energized, the colored coats 40 in openings 34 are illuminated and appear as bright colored patches. In the illustrative embodiment, the brightly colored patches are "framed" by those areas of the opaque coat 33 which is still opaque even when the lamps are energized to the incandescent light emitting state. Thus in the absence of light striking said coats 40 and traveling in a direction from the rear face to the front face of the panel (due to the lamps not being energized), said coats 40 are practically invisible when said panel is front viewed by the naked eye and consequently when so viewed, the entire panel 30 is opaque and of low gloss or matte black appearance. However, when so viewed, while said lamps are energized and incandescent to back light said panel 30, the opaque backed portions of said panel are still opaque and of low gloss or matte appearance but those areas of member 31 defined by openings 34 and carrying said coats 40 are visible as illuminated indicia as before described to provide read-out information.

It is to be understood that the layer 35, which is clear, colored, transparent, homogeneous layer may be of any desired composition and layers 37 and 38 also may be of any desired composition, known to the art. The layers 37 and 38 are preferably composed of a water-white resinous material carrying very finely divided light diffusing particles, which particles individually are transparent or translucent. The resinous component may be one which may or may not require heat curing. However, the latter type also known to the art and including among other the thermosetting modified alkyd chemical coatings are preferably used in order to obtain films which have high abrasion and scratch resistance. Although member 31 is preferably a plastic, examples of which are the "Plexiglas" (polyacrylate type sheets) which are tinted and of the numbers heretofore set forth, it is to be understood that tinted glass or other plastic and in fact any other sheet may be substituted therefore provided it has the desired light transmittance characteristics (a), (b), (c) and (d) before set forth.

Since certain changes may be made in the above articles and devices and different embodiments of the invention could be made without departing from the scope thereof, it is intended that all matter contained in the above description or shown in the accompanying drawings shall be interpreted as illustrative and not in a limiting sense.

I claim:

1. A novel article of manufacture comprising:
   a member capable of transmitting light and of the following light transmitting characteristics determined by employing the ASTM D307–44 method with a C.I.E. source A:

transmittance of white light being at least 5% and no greater than 30%;

transmittance of light waves in the spectrum of 500 to 580 millimicrons averaging at least 5% and no greater than 30%;

transmittance of light waves in the spectrum of 580 to 640 millimicrons averaging at least 5% and no greater than 30%; and transmittance of light waves in the spectrum of 540 to 700 millimicrons averaging at least 5% and no greater than 35%;

an opaque coat adjacent to the normally rear face of said member, said coat having an opening therein;

a colored indicia coat adjacent to said face of said member at said opening, said colored coat capable of transmitting light in the visible spectrum and of diffusing light;

when in the absence of light striking said colored indicia coat and traveling in a direction towards and then from the said normally rear face towards the normally front face of said member, said colored indicia coat being practically invisible when said article of manufacture is viewed by the naked eye looking in a direction towards the normally front face of said article of manufacture;

said colored indicia coat being readily visible as an illuminated indicia as viewed by the naked eye looking in said second mentioned direction when light is incident on said colored indicia coat and traveling in said first mentioned direction;

said member being transparent and tinted gray and therefore neutral so that a color hue is not imparted to light transmitted thereby.

2. An article of manufacture as defined in claim 1, said colored coat comprising a clear, colored, transparent homogeneous layer and a light transmitting and light diffusing layer, one of said layers being superimposed upon the other.

3. An article of manufacture as defined in claim 1, said colored coat comprising a clear, colored, transparent, homogeneous layer and a pair of light transmitting and light diffusing layers, said first layer disposed between said pair of layers.

4. An article of manufacture as defined in claim 1, said colored coat comprising a clear, colored, transparent, homogeneous layer and a light transmitting and light diffusing layer, one of said layers superimposed upon the other, said light transmitting and light diffusing layer being of the following light transmittance characteristics:

transmittance of white light, green light (500–580 millimicrons), yellow and orange light (580–640 millimicrons), red light (640–700 millimicrons) being at least 90%.

5. An article of manufacture as defined in claim 1, said colored coat comprising a clear, colored, transparent, homogeneous layer and a pair of light transmitting and light diffusing layers, said transparent layer disposed between said pair of layers, each of said light transmitting and light diffusing layers being of the following light transmittance characteristics:

transmittance of white light, green light (500–580 millimicrons), yellow and orange light (580–640 millimicrons), red light (640–700 millimicrons) being at least 90%.

6. An article of manufacture as defined in claim 1, and a light transmitting and light diffuser coat secured to said member, disposed at the normally front face thereof and having white light, red light (640–700 millimicrons), yellow and orange light (580–640 millimicrons) and green light (500–580 millimicrons) transmittance values of at least 90%; the normally front face of said article of manufacture having a gloss value in the range of 5–55 units as determined by using 60 degree Specular Gloss Test in accordance with ASTM D523–53T method.

7. An article of manufacture as defined in claim 1, and a light transmitting and light diffuser coat secured to said member, disposed at the normally front face thereof and having white light, red light (640–700 millimicrons), yellow and orange light (580–640 millimicrons) and green light (500–580 millimicrons) transmittance values of at least 90%; the normally front face of said article of manufacture having a gloss value in the range of 5–55 units as determined by using 60 degree Specular Gloss Test in accordance with ASTM D523–53T method, said colored coat comprising a clear, colored, transparent, homogeneous layer, and a light transmitting and light diffusing layer, one of said layers being superimposed upon the other, said light transmitting and light diffusing layer having white light, red light (640–700 millimicrons), yellow and orange light (580–640 millimicrons) and green light (500–580 millimicrons) transmittance values of at least 90%.

8. An articles of manufacture as defined in claim 1, and a light transmitting and light diffuser coat secured to said member, disposed at the normally front face thereof and having white light, red light (640–700 millimicrons), yellow and orange light (580–640 millimicrons) and green light (500–580 millimicrons) transmittance values of at least 90%; the normally front face of said article of manufacture having a gloss value in the range of 5–55 units as determined by using 60 degree Specular Gloss Test in accordance with ASTM D523–53T method, said colored coat comprising a clear, colored, transparent, homogeneous layer, and a pair of light transmitting and light diffusing layers, said clear, colored, layer being disposed between said pair of layers, each of said light transmitting and light diffusing layers having white light, red light (640–700 millimicrons), yellow and orange light (580–640 millimicrons) and green light (500–580 millimicrons) transmittance values of at least 90%.

9. An article of manufacture as defined in claim 1, in combination with a chamber carrying a source of light, and having an opening in the front thereof, said article of manufacture covering said opening, with the coated indicia coat thereof facing said source of light.

10. A novel article of manufacture according to claim 1, said coats being superimposed one upon the other.

11. A novel article of manufacture according to claim 2, said colored coat comprising a clear, colored, transparent homogeneous layer and a light transmitting and light diffusing layer, said opaque coat and said layers being superimposed one upon another, each of said layers having white light, red light (640–700 millimicrons), yellow and orange light (580–640 millimicrons) and green light (500–580 millimicrons) transmittance values of at least 90%.

References Cited

UNITED STATES PATENTS

| | | | |
|---|---|---|---|
| 1,888,584 | 11/1932 | Cadieux | 40—133 |
| 2,104,280 | 1/1938 | Spratley et al. | 40—135 |
| 2,998,667 | 9/1961 | Darnell et al. | 40—132 |
| 3,197,903 | 8/1965 | Walley | 40—135 X |

LAWRENCE CHARLES, *Primary Examiner.*

UNITED STATES PATENT OFFICE
CERTIFICATE OF CORRECTION

Patent No. 3,389,484

June 25, 1968

George Mullins

It is certified that error appears in the above identified patent and that said Letters Patent are hereby corrected as shown below:

Column 7, line 13, "540" should read -- 640 --. Column 8, line 27, "articles" should read -- article --.

Signed and sealed this 10th day of March 1970.

(SEAL)
Attest:

Edward M. Fletcher, Jr.
Attesting Officer

WILLIAM E. SCHUYLER, JR.
Commissioner of Patents